United States Patent [19]
Chandross et al.

[11] Patent Number: 5,700,696
[45] Date of Patent: Dec. 23, 1997

[54] METHOD FOR PREPARATION OF CONJUGATED ARYLENE OR HETEROARYLENE VINYLENE POLYMER AND DEVICE INCLUDING SAME

[75] Inventors: Edwin Arthur Chandross, Murray Hill; Mary Ellen Galvin-Donoghue, Hopewell Township, Mercer County; Fotios Papadimitrakopoulos, North Plainville Township, Somerset County, all of N.J.

[73] Assignee: Lucent Technologies Inc., Murray Hill, N.J.

[21] Appl. No.: 148,599

[22] Filed: Nov. 8, 1993

[51] Int. Cl.$^6$ ........................................ H01L 51/40
[52] U.S. Cl. ........................... 437/1; 257/40; 257/103; 313/504; 528/481; 528/490
[58] Field of Search ............... 257/40, 103; 313/504, 313/503; 528/380, 373, 391, 481, 490; 437/1

[56] References Cited

U.S. PATENT DOCUMENTS 5,247,190  9/1993  Friend et al. .................. 257/40

OTHER PUBLICATIONS

Burroughs et al.; Light–Emitting Diodes Based on Conjugated Polymers Nature, vol. 347, Oct. 11, 1990, pp. 539–541.

P.L. Burn et al.; Chemical Tuning of Electroluminescent Copolymers to Improve Emission Efficiencies; Nature, vol. 356, Mar. 5, 1992, pp. 47–49.

Yoshino et al.; Optical Recording Utilizing Conducting Polymers; Japanese Journal of Applied Physics, vol. 29, No. 8, Aug. 1990, pp. 1514–1516.

*Primary Examiner*—Sara W. Crane

[57] ABSTRACT

A technique is described for the preparation of conjugated arylene and heteroarylene vinylene polymers wherein conversion of the polymer precursor is effected at a temperature ranging from 150°–300° C. in the presence of forming gas. Studies have shown that the presence of the forming gas suppresses the formation of carbonyl groups, so resulting in an enhancement in photoluminescence and electroluminescence efficiency of the polymer.

10 Claims, 3 Drawing Sheets

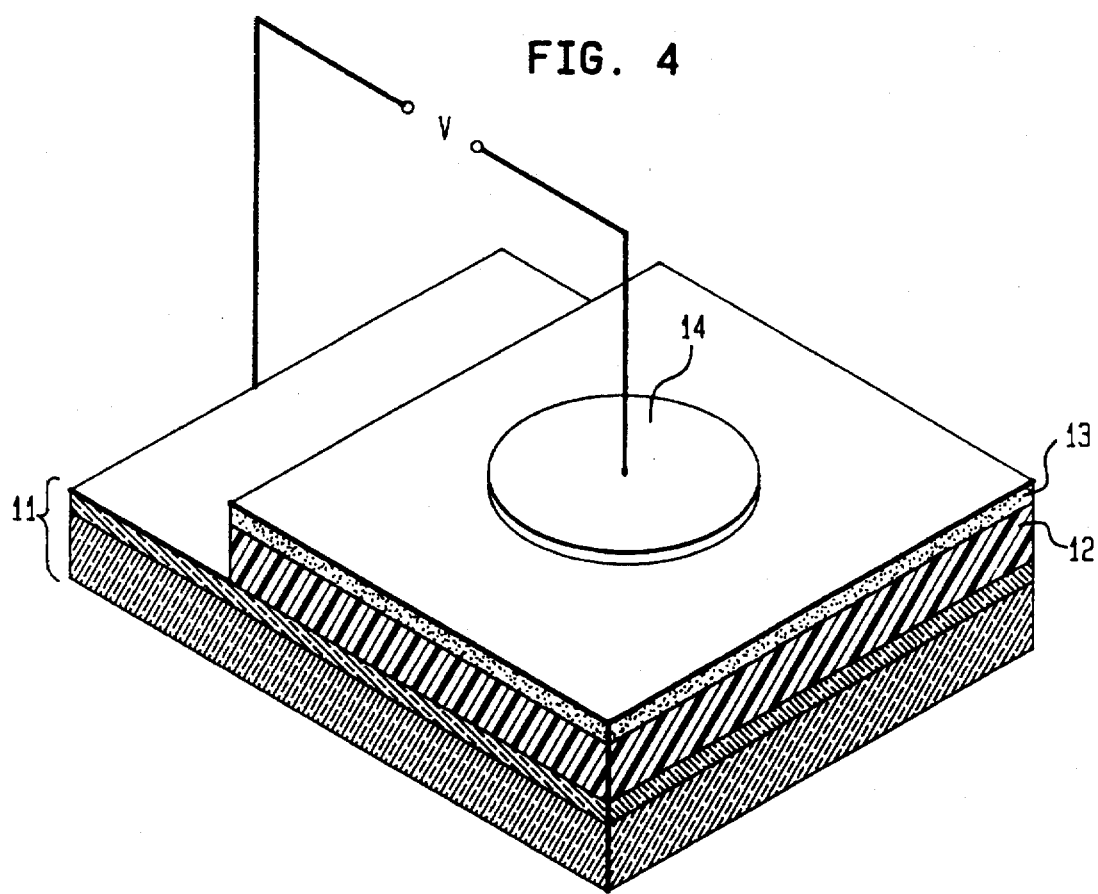

METHOD FOR PREPARATION OF CONJUGATED ARYLENE OR HETEROARYLENE VINYLENE POLYMER AND DEVICE INCLUDING SAME

FIELD OF THE INVENTION

This invention relates to a method for the preparation of conjugated arylene or heteroarylene vinylene polymers by thermal conversion of a precursor polymer in a controlled atmosphere.

BACKGROUND OF THE INVENTION

Recently, significant advances have been made in the development of solid-state light emitting devices. Among the most recent discoveries was the discovery that conjugated polymers are particularly well suited for this purpose in that they provide excellent charge transport characteristics and useful quantum efficiencies for luminescence. The most popular of the materials suitable for this use is poly (p-phenylene vinylshe) (PPV) which is capable of being prepared in the form of a high quality film which evidences strong photoluminescence in a band centered near 2.2 eV.

Heretofore, synthesis of poly (p-phenylene vinylshe) and its analogs has been commonly effected by preparing a precursor polymer and thermally converting the precursor in a vacuum or inert atmosphere to the desired poly (p-phenylene vinylene). A typical procedure for attaining this end involves polymerization of a his sulfonium salt intermediate, prepared from dichloro p-xylene and tetrahydrothiophene, in a water-methanol mixture in the presence of a base and subsequently dialyzing against distilled water to remove inorganic salts and unreacted monomer. The precursor polymer is then recovered, dissolved in methanol and spin coated upon a suitable substrate. At this juncture, the precursor is thermally converted at a temperature ranging from 150°–300° C. in a vacuum or in an inert atmosphere comprising argon or nitrogen to yield the desired poly (p-phenylene vinylene). This processing sequence is shown in Equation 1.

Although the resultant films have proven to be stable in air at room temperature and in vacuum at temperatures less than 300° C., and evidence satisfactory photoluminescence, certain inherent limitations in the processing sequence have limited photoluminescence efficiency. Thus, it has been found that during the thermal conversion process carbonyl groups are formed. These groups are known to quench photoluminescence, so limiting the exploitation of poly (p-phenylene vinylene). Workers in the art have recognized this limitation and efforts to minimize carbonyl formation have focused upon minimizing exposure to oxygen at elevated temperatures by the use of better vacuum systems and/or the use of argon of higher purity.

SUMMARY OF THE INVENTION

In accordance with the present invention, this prior art limitation has been effectively obviated by a novel processing sequence wherein thermal conversion of the polymer precursor is effected in a reducing atmosphere comprising 15% hydrogen in nitrogen. It has been found that in this reducing atmosphere the number of carbonyl groups is reduced by as much as a factor of 5, so resulting in a dramatic enhancement in photoluminescence. The device performance of material so obtained has been found to be superior to that reported by others who conducted the conversion in "vacuum" or under an "inert" atmosphere.

BRIEF DESCRIPTION OF THE DRAWING

The invention will be more readily understood by reference to the following detailed description taken in conjunction with the accompanying drawing wherein:

FIG. 4 is a front elevational view in cross section of an electroluminescent device prepared in accordance with the present invention.

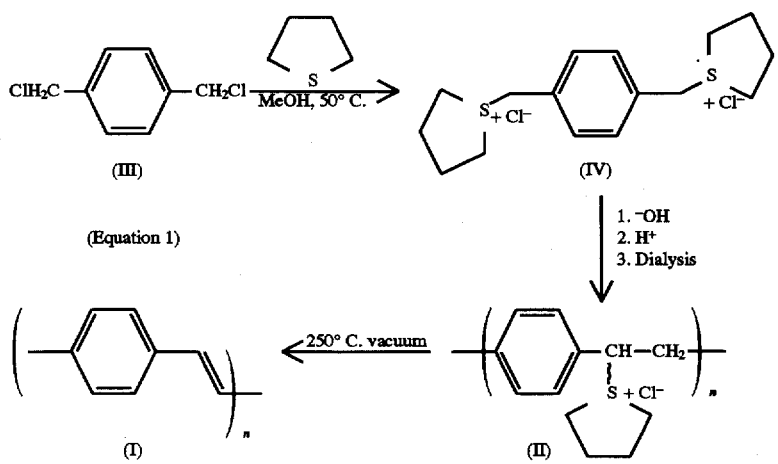

(Equation 1)

DETAILED DESCRIPTION OF THE INVENTION

Figure 1:
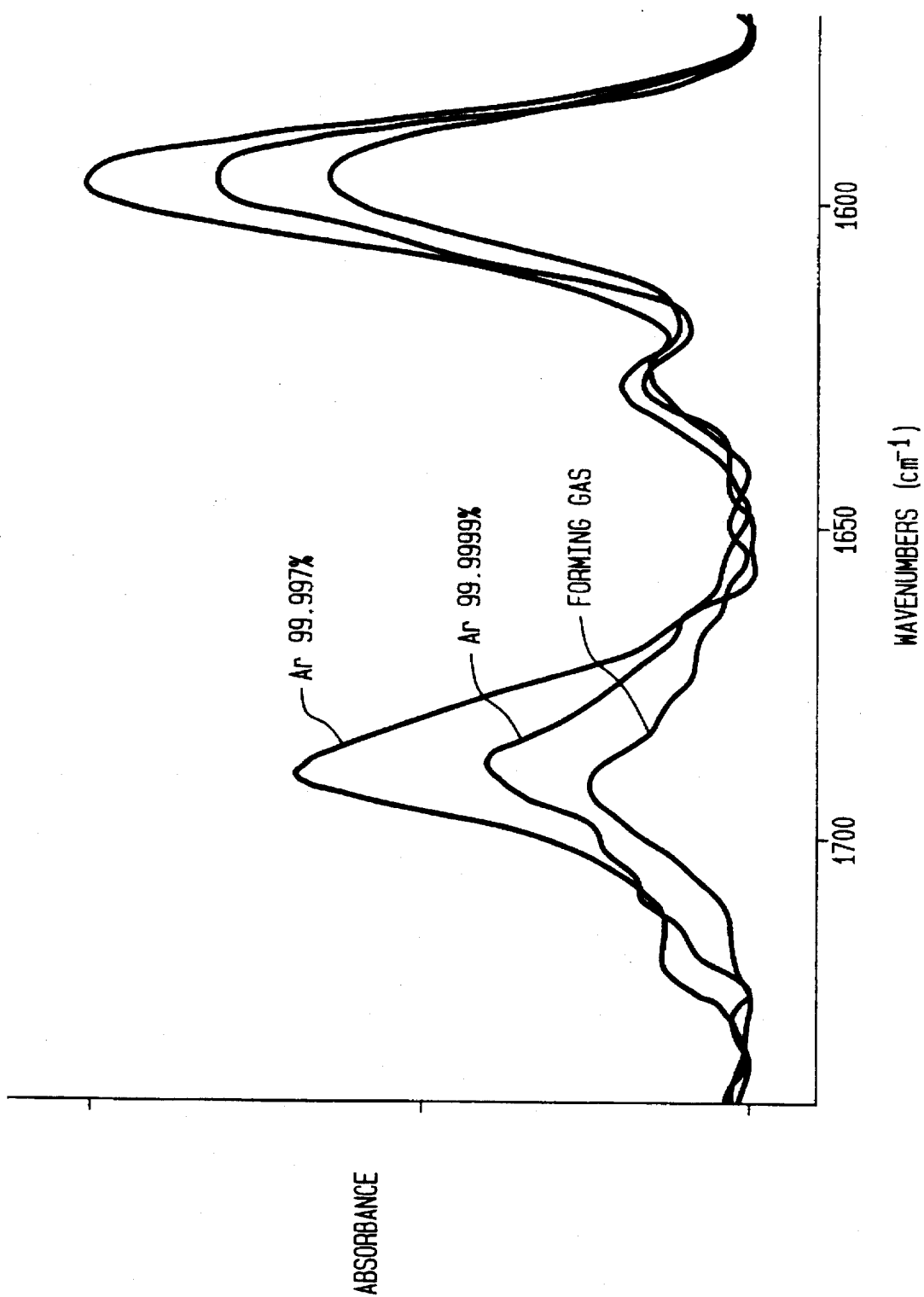
FIG. 1 is a graphical representation on coordinates of wavenumbers against absorbance showing the carbonyl region of the FTIR spectra obtained for three samples of precursor converted thermally at 300° C.

The first step in the practice of the present invention involves synthesizing the precursor polymer by known techniques. Material suitable for this purpose are of the general formula:

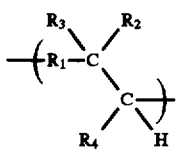

wherein $R_1$ is selected from among aryl groups such as benzene or substituted benzenes such as anthracenes, napthalenes, alkyl substituted benzene, alkoxy substituted benzenes and the like, or a five member cyclic heterocarbon such as thiophene and substituted thiophene;

$R_2$ and $R_4$ are selected from among phenyl groups and hydrogen; and $R_3$ is selected from among organic groups such as tetrahydrothiophenium or $OR_5$ groups wherein $R_5$ is chosen from among hydrogen and the lower alkyl groups which groups may be eliminated at high temperatures with or without the presence of a catalyst.

The reaction of the precursor during the thermal conversion is shown in Equation 2 as follows:

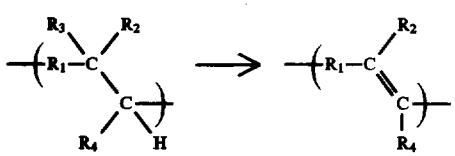

(Equation 2)

A typical procedure for preparing the precursor follows. It will be understood that the described procedure is set forth solely for purposes of exposition and is not to be construed as limiting.

The reaction and spinning solvents are bubbled overnight with prepurified argon which has previously been passed over activated copper to remove oxygen. The monomer selected is p-xylenebis(tetrahydrothiophenium chloride) which may be purified by dissolving it in a small amount of water, filtering the nonsoluble impurities and precipitating it in cold acetone. The resultant white powder is then filtered, dried in argon and briefly stored at −40° C. away from room light prior to polymerization. The polymerization of this monomer to yield the precurser polymer is effected by adding an equimolar aqueous sodium hydroxide solution to a 0.25 molar water solution of the monomer cooled to 1° C. Polymerization is quenched by the addition of sufficient 1N hydrochloric acid solution to yield a pH of 7 as soon as the viscosity rises substantially, typically after a time interval within the range of 5 to 15 minutes. The resultant solution is then dialyzed against distilled water through a commercially available SPECTRA/POR membrane having a 6,000 to 8,000 molecular weight cutoff and stored at −5° C. The precursor polymer is then precipitated from its water solution by isopropanol and filtered and washed with anhydrous ethyl ether and dried under a stream of argon.

Thin films of the precursor polymer ranging in thickness from 500–3000 Angstroms, typically 1,000 Angstroms after conversion, may then be prepared by spinning a 1% methanol solution of the precursor on fused silica glass or silicon wafers.

Conversion of the precursor to poly(p-phenylene vinylene) is then effected at temperatures ranging from 150° to 300° C. under controlled atmospheres.

In the preparation of both the precursor films and the poly(p-phenylene vinylene), it is important to exercise care to assure that each is handled in an inert atmosphere during the preparative steps, particularly in transferring samples in and out of the apparatus and during measurements. Ultraviolet and visible light with the exception of red light should also be excluded during the synthesis and characterization stages of the procedure.

The thermal conversion of the precursor was effected in the following environments (gas purities being specified by suppliers):

(a) 99,997% pure argon having more than 1 ppm oxygen content (obtained from commercial sources);

(b) 99.9999% pure argon having less than 0.5 ppm oxygen content (obtained from commercial sources); and (c) Forming gas comprising 85% nitrogen of 99,998% purity having more than 1 ppm oxygen content, and 15 hydrogen of 99.5% purity having more than 10 ppm oxygen content (obtained from commercial sources).

Thermal conversion of the precursor polymer was effected in a glass vessel equipped with a thermocouple. The vessel was placed in an oven, the temperature of which was controlled by a programmable temperature controller linked to the thermocouple. The glass vessel was maintained under a constant flow of one of the gaseous environments during the heat-up, conversion and cooling cycles which were as follows:

(a) 1 hour at 20° C. to remove residual solvent, (b) 5 hours to ramp up to the conversion temperature, (c) 6 hours at the conversion temperature, and (d) cooling to ambient temperature within 2 hours.

Conversion temperature was maintained at 200°, 250° and 300° C.

Following preparation of the desired poly(p-phenylene vinylend), samples prepared at the different conversion temperatures and in different gaseous environments were evaluated and characterized.

Infrared spectroscopic data were obtained using a Mattson RS-1 Fourier transform infrared spectrophotometer using a liquid nitrogen cooled wide band HgCdTe detector at 4 $cm^{-1}$ resolution Thin poly(p-phenylene vinylene) films (1000 Angstroms) were prepared on one side of a double polished (100) silicon wafer. The poly(p-phenylene vinylene) was held at 45 degrees with respect to the incident infrared beam to increase the sampling path length and to eliminate the interference fringes from the double polished silicon wafer. A minimum of 200 scans were signaled averaged. The FTIR spectrum of the silicon wafer was included in the spectrometer's background to assure minimum signal contribution from the silicon substrate.

Fluorescence data were obtained from a Spex Fluorolog -2 spectrofluorometer with a xenon lamp, excitation at 400 nm, as a source and a gallium arsenide photomultiplier detector.

Film thicknesses were measured on a Dektak instrument and fluorescence intensity and the area under the carbonyl peaks in the FTIR spectra was corrected for variations in film thickness.

With reference now to FIG. 1, there is shown a graphical representation on coordinates of wavenumbers against absorbance showing the carbonyl region of the FTIR spectra obtained for three samples of precursor polymer subjected to thermal conversion in the three environments previously identified. It will be Noted that the least amount of carbonyl groups occurs when using forming gas for the conversion, the area of the carbonyl peaks being substantially smaller with forming gas than it is with high purity argon notwithstanding the fact that more oxygen is present in the forming gas.

Figure 2:
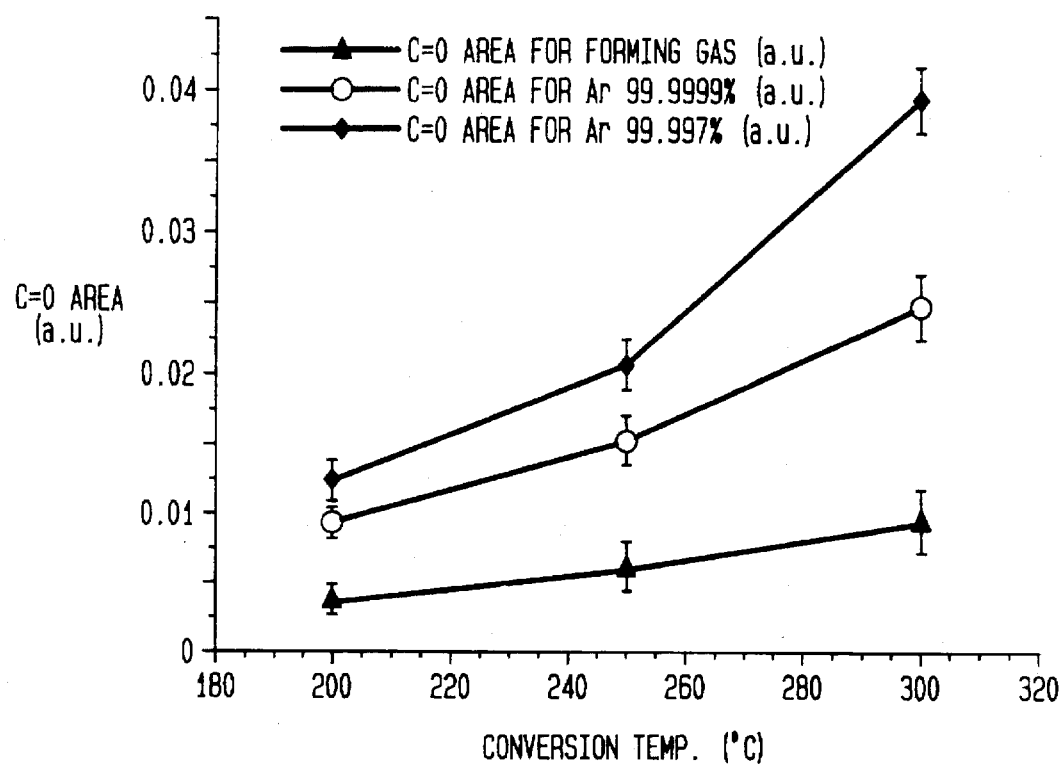
FIG. 2 is a graphical representation on coordinates of conversion temperature in degrees Centigrade against approximate carbonyl area showing the carbonyl peaks for the thermal conversion of the precursor at 200° C., 250° C. and 300° C.

FIG. 2 is a graphical representation on coordinates of conversion temperature against carbonyl area showing the carbonyl peaks for the three environments employed in the conversion process. Again, it will be noted that at any given temperature, the amount of carbonyl groups present in the sample is lowest when forming gas is employed for the thermal conversion as compared with conversion in the presence of high purity argon. It is apparent that for any given atmosphere, the carbonyl content increases with increasing temperatures.

Figure 3:
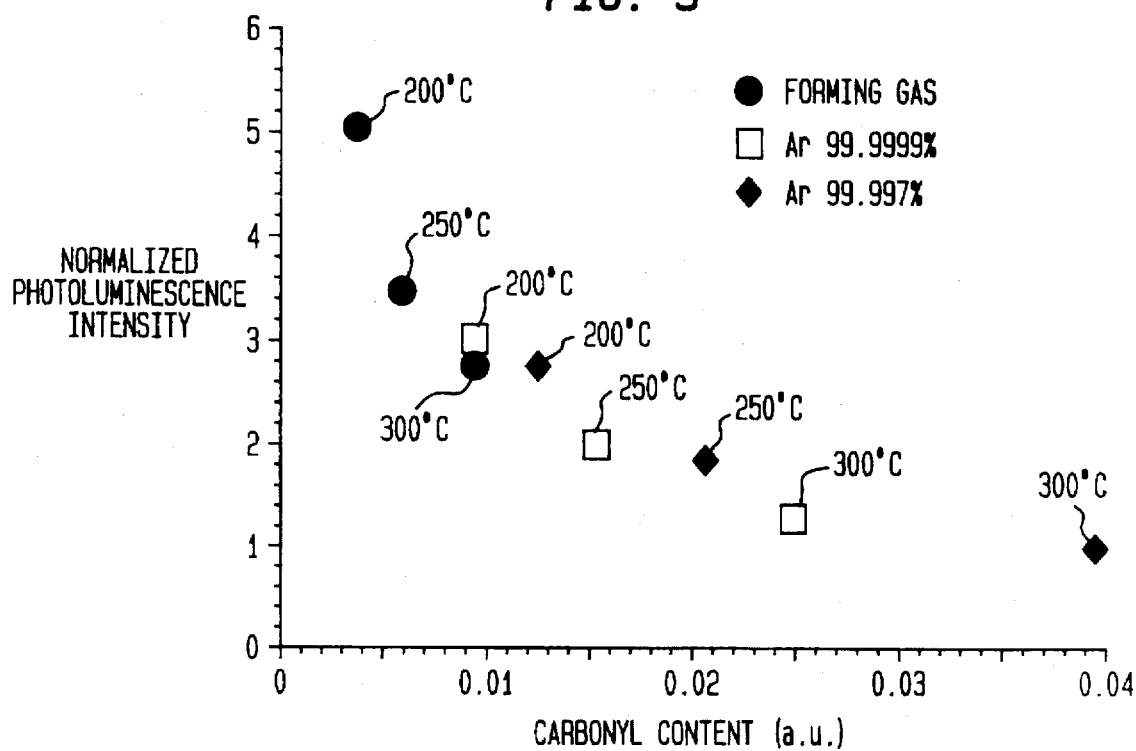
FIG. 3 is a graphical representation on coordinates of carbonyl content against normalized photoluminescence intensity showing the affect carbonyl moieties have on luminescence.

The affect of carbonyl moieties on luminescence is indicated by reference to FIG. 3 which is a graphical representation on coordinated of carbonyl content against normalized photoluminescence. It is noted that photoluminescence decreases with increasing carbonyl content. Photoluminescence intensity was found to be highest in the forming gas environment at each of the temperatures employed. In fact, the best results obtained with forming gas evidence a luminescence intensity five times greater than the poorest results attained with 99,997% purity argon at 300° C.

FIG. 4 is a front elevational view in cross-section of a typical electroluminescent device including the novel conjugated arylene or heteroarylene vinylene polymers converted in the presence of forming gas by thermal means. Shown in the Figure is a substrate member 11 having deposited thereon a thin film of a conjugated arylene or heteroarylene vinylene polymer 12 prepared in the manner described. Also shown is an electron injecting layer 13 and a conducting layer 14.

In order to demonstrate the utility of the present invention, light emitting diodes were prepared in accordance with the following procedure.

An indium tin oxide (ITO) coated glass substrate was chosen as the substrate and cleaned by sequential ultrasonication in deionized water, methanol, acetone and trichloroethane, and then dried and baked at 200° C. in an inert atmosphere. Following, a thin film having a thickness of 2000 Angstroms of poly (p-phenylene vinylene) (PPV) precursor was spun onto the substrate by conventional spinning techniques and converted at 200° C. in the presence of forming gas to yield a film of approximately 1000 Angstroms in thickness. At this juncture a thin film of aluminum was deposited through a shadow mask upon some of the films to form devices. Alternatively, an electron injection layer was deposited prior to the aluminum. The electron injecting layer was used to enhance the electroluminescence of the resultant device. This end was attained by dissolving 0.02 gram of poly (methyl methacrylate) (PMMA) and 0.06 gram of 2-(4-biphenylyl)-5-( 4-tert-butylphenyl)-1,3,4-oxadiazole (PBD) in 10 milliliters of chloroform. The resultant solution was then spun at 2,000 rpm onto the ITO/PPV substrate in a glove box to yield a PMMA+PBD film having a thickness of approximately 300 Angstroms upon the poly(p-phenylene vinylene) layer. Next, aluminum was deposited by thermal evaporation upon the PMMA/PBD layer. Devices prepared were in the form of circular dots defined by means of a metal mask.

Light was emitted from the described structures when the ITO was biased positively and the aluminum biased negative. Measurement of the light emitted from these light emitting diodes (LEDs) was effected with a silicon photodiode, and internal quantum efficiencies were calculated by taking into account losses in glass substrates, the solid angle of the photodiode collection, ITO transmission losses, and the responsiveness of the photodiode.

The ITO/PPV/Al devices were initially operated at 12 volts. At 15 volts, the current density flowing through the device was about 10 mA cm$^{-2}$ and the internal quantum efficiency was 0.09% plus or minus 0.01%. Similar electroluminescent devices described in the prior art evidenced internal quantum efficiencies of approximately 0.01%.

The ITO/PPV/(PMMA+PBD)/Al devices were initially operated at 32 volts. At 35 volts, the current density flowing through the device was about 5 mA cm$^{-2}$ and the internal quantum efficiency was 0.55% plus or minus 0.01%. Similar electroluminescent devices described in the prior art evidenced internal quantum efficiencies of approximately 0.06%.

Based upon the foregoing data, it is evident that the electroluminescent devices prepared with the poly(p-phenylene vinylene) and converted thermally in the described manner in the presence of forming gas evidence an improvement in internal quantum efficiencies over prior art devices which is almost an order of magnitude While the invention has been described in detail in the foregoing description and in the illustrative embodiment, it will be appreciated by those skilled in the art that many variations may be made without departing from the spirit and scope of the invention. Thus, for example, it will be understood that homopolymers and copolymers may be employed in the practice of the present invention with the same level of improvement in electroluminescence characteristics. It will be further understood by those skilled in the art that related systems may be subject to similar oxidative degradation at elevated temperatures, as for example, heteroarylene based polymers. Such a degradative process would be expected to have a deleterious effect on carrier mobility in semiconducting polymers such as poly (thienylene vinylene) which have been proposed for use in thin film transistors.

What is claimed is:

1. Method for the preparation of conjugated arylene and heteroarylene vinylene polymers which comprises thermal conversion of a precursor polymer of the general formula

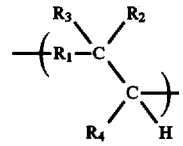

wherein $R_1$ is selected from the group consisting of benzene, substituted benzene, anthracene, naphthalene and alkyl substituted benzene, and a five member cyclic heterocarbon, $R_2$ and $R_4$ are selected from the group consisting of hydrogen and phenyl groups, and $R_3$ is an organic group capable of being eliminated at elevated temperatures to form a double bond, or an $OR_5$ group wherein $R_5$ is selected from the group consisting of hydrogen and methyl groups, conversion being effected at a temperature ranging from 150°–300° C. in the presence of forming gas.

2. Method in accordance with claim 1 wherein the gas comprises at least 5% hydrogen.

3. Method in accordance with claim 1 wherein the thermal conversion is effected at 200° C.

4. Method in accordance with claim 1 wherein a thin film of the precursor polymer is prepared by spin coating a thin film thereof upon a substrate and effecting thermal conversion of the film.

5. Method in accordance with claim 1 wherein the substrate is fused silica glass.

6. Method in accordance with claim 1 wherein the substrate is a silicon wafer.

7. Method in accordance with claim 1 wherein the substrate is indium tin oxide coated glass.

8. Method in accordance with claim 1 wherein the forming gas is comprised of 85% nitrogen and 15% hydrogen.

9. Method in accordance with claim 1 wherein the precursor film is maintained in an inert atmosphere and protected from exposure to ultraviolet and visible light with the exception of red light during the preparative stages.

10. Method in accordance with claim 1 wherein the conjugated polymer is poly (p-phenylene vinylene).

* * * * *